Oct. 5, 1948.     W. J. MILLER     2,450,437
METHOD AND APPARATUS FOR MANUFACTURING POTTERY WARE
Filed May 16, 1942     7 Sheets-Sheet 2

INVENTOR.
WILLIAM J. MILLER
BY
George J. Croninger
ATTORNEY.

Oct. 5, 1948.  W. J. MILLER  2,450,437
METHOD AND APPARATUS FOR MANUFACTURING POTTERY WARE
Filed May 16, 1942  7 Sheets-Sheet 3

INVENTOR.
WILLIAM J. MILLER
BY
george J. Croninger
ATTORNEY.

Oct. 5, 1948.  W. J. MILLER  2,450,437
METHOD AND APPARATUS FOR MANUFACTURING POTTERY WARE
Filed May 16, 1942  7 Sheets-Sheet 4

INVENTOR.
WILLIAM J. MILLER
BY George J. Croninger
ATTORNEY.

Oct. 5, 1948. W. J. MILLER 2,450,437
METHOD AND APPARATUS FOR MANUFACTURING POTTERY WARE
Filed May 16, 1942 7 Sheets-Sheet 6

INVENTOR.
WILLIAM J. MILLER
BY
George J. Croninger
ATTORNEY.

Oct. 5, 1948.  W. J. MILLER  2,450,437
METHOD AND APPARATUS FOR MANUFACTURING POTTERY WARE
Filed May 16, 1942  7 Sheets-Sheet 7

INVENTOR.
WILLIAM J. MILLER
BY
George J. Cominger
ATTORNEY.

Patented Oct. 5, 1948

2,450,437

UNITED STATES PATENT OFFICE 2,450,437

METHOD AND APPARATUS FOR MANUFACTURING POTTERY WARE

William J. Miller, Swissvale, Pa., assignor to Miller Pottery Engineering Company, Swissvale, Pa., a corporation of Pennsylvania Application May 16, 1942, Serial No. 443,226

36 Claims. (Cl. 25—22)

This invention relates to methods and apparatus for manufacturing pottery ware, particularly high-grade jiggered dinnerware and the like.

In making ware of this description, the dry ingredients are mixed with water, and after a process of refinement, are filter pressed for the purpose of removing excess liquid. The clay, at this stage, is plasticized, but is not of uniform consistency and in order to more thoroughly mix and homogenize the material, it is macerated by the knives of a pug mill and then forced by an auger through an extrusion die or through a shredder and then through an extrusion die. Sometimes, the clay is shredded in a vacuum chamber in order to improve plasticity, homogeneity and workability. The extruded material is cut off in pugs containing sufficient material for several mold charges and, where the ware is being made by certain types of automatic machinery, these pugs are fed in endwise fashion to a cut-off wire which severs mold charges therefrom with periodic regularity and in timed relation with the presentation of molds at the feeding position, which receive the charges.

It is known that pugs of clay produced by the process described, which is more or less a standard process universally used in dinnerware potteries, are possessed of certain undesirable physical properties which have a detrimental effect on fabricating, drying and firing behavior of the clay and its glaze holding properties. Improvements in process and apparatus for preparing clay pugs have not succeeded in reducing these undesirable physical properties to any appreciable extent. The present invention has to do with apparatus for and a method of treatment of the pugged clay by means of which the aforesaid physical properties are eliminated altogether or reduced to harmless proportions.

There are several different kinds of undesirable physical properties and they differ in nature and origin. Pugs are seldom of uniform texture throughout due to variations in the consistency of the plastic material comprising the original filter cake, for instance, the perimetral zone of the cake is composed of clay harder in consistency than the core or center section which is usually soft. Macerating and mixing these two extremes together in a pug mill does not efficiently blend them and as a consequence the pug is said to have hard and soft spots or to be lumpy. When pressing a charge of clay out thin on the mold, the hard clay resists spreading and sometimes the pressure becomes great enough to crack the plaster mold. Also, in jiggering, the tool will tend to roughen the hard spots in spite of an abundance of lubricant and this spoils the surface of the ware. In drying, due to a variation in moisture content as between the harder or stiffer clay and the softer clay, the harder zones will dry faster than the softer zones and the resulting unequal shrinkage produces various defects prominent among which is warping.

I also believe that the treatment received by the clay while passing through the pug mill introduces internal stresses and strains which are not relieved, whilst the clay is in the plastic state and are responsible in part for the cracked and warped condition of some of the ware after drying or firing. Furthermore, the auger tends to laminate the clay in spiro-conical fashion and these laminations are pressed together again as the clay extrudes through the die so that the pug is actually composed of a number of layers of clay. I believe that later, during drying and firing, these laminations or vestiges thereof in the charge of clay are directly responsible for much of the cracked and warped ware.

I do not profess to know all about the exact nature and character of the various undesirable physical properties contained or the exact nature of the reactions which causes warping, cracking, etc., in a pug of clay, however, I have found that the novel method and apparatus herein disclosed has a beneficial effect on the clay which results in an appreciable reduction in losses from cracking and warping, both in the dried and fired stage, and is also accountable for smoother, more even display surfaces and a more homogeneous, finer textured body having superior glaze holding properties.

The clay spreads easier when applied to the mold and finishes off smoothly under the profile tool. Ripped backs, tool marks, rough spots are substantially eliminated and the production of merchantable ware from a given amount of clay is greatly increased due to the curtailment of losses heretofore thought unavoidable and accepted by the potter as inevitable. Furthermore, finishing costs and losses are greatly reduced because of the excellent condition of the display surface of the ware, when dried.

According to my method, the pug of clay with its undesirable physical properties is severed across the long axis to produce individual mold charges, but before the clay charge is fabricated and if desired, while still a part of the clay pug, it receives conditioning treatment which consists in puddling the same, an operation which kneads or works the clay and thereby breaks up laminations and relieves internal strains followed by a troweling operation or a smoothing and polishing of the surface of the previously puddled zone which makes for a satiny, smooth display surface devoid of pin holes. This later operation is performed by blade type spreaders with or without actual shaping of the clay to fit the molding surface. I prefer to puddle and trowel the surface of the clay which goes against the molding surface (which is a distinguishing feature over the method taught in my co-pending application, S. N. 320,007) now Patent No. 2,370,410, and then by a subsequent troweling operation puddle and trowel the opposite side of the blank, preferably after the blank has been applied to the mold.

I also wish it understood that the charge of clay may be troweled only, as by the use of spreader blades, in the interest of smoothing the clay to eliminate pinholes without departing from the spirit and scope of the invention.

My method and apparatus are herein disclosed as they would be incorporated in an automatic system and apparatus for jiggering clay on molds to thereby provide for the automatic mechanical manufacture of ware of the class described from pugged clay mass to jiggered mold bonded product ready for drying. The invention comprehends the making of hollow ware as well as flatware in similar or diversified shapes.

Other objects and advantages will become apparent by reference to the specification and the accompanying drawings, in which.

Figure 29:
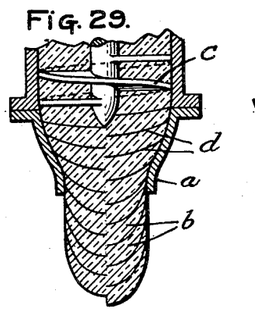
Fig. 29 is a detail section taken through the extrusion die portion of a pug mill illustrating how laminations are formed by the auger and how they appear in section.
Figure 30:
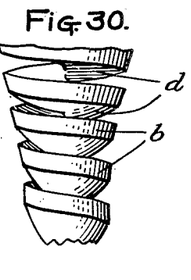
Fig. 30 is a fragmentary view of a clay pug showing how its spiro-conical convolutions would appear if the pug was pulled out longitudinally from each end.
Figure 31:
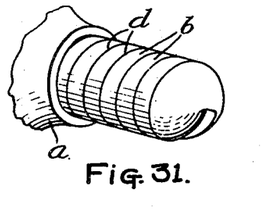
Fig. 31 is a view in perspective of the clay pug as it emits from the extrusion die showing how the laminations would appear if visible to the naked eye. They are not visible as a rule because of the surface smoothing effect of the extrusion die.
Figure 32:
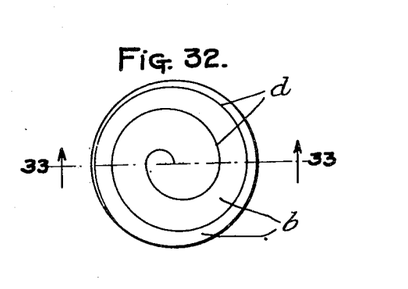
Fig. 32 is a face view of a charge cut from the clay column.
Figure 33:
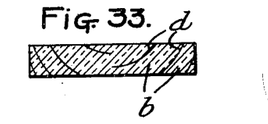
Fig. 33 is a section of a charge taken on the section line of Fig. 32.

As the clay column emerges from the extrusion nozzle $a$ (Fig. 29), it constitutes an amalgamation of spiro-conical convolutions $b$ (Fig. 30), a physical condition which has a detrimental effect on the drying and firing behavior of the clay. These convolutions are produced by the spiral of the pug auger $c$ (Fig. 29) and the clay passes from the top of the auger into the extrusion die in the shape of a tightly wound spiral. Due to the fact that the amalgamated surfaces $d$ of the clay convolutions have been troweled by the auger, these surfaces are believed to have a different texture and shrinkage coefficient in firing than the inner body of the clay. Thus when a charge is cut from the clay column (see Figs. 32–33), the amalgamated surfaces $d$ will appear on both sides of the charge in the form of a scroll, and small fissures or scratches might also be produced on said sides by the cutting implement. The charge may also have internal stresses and strains due to the twisting movements imposed by the auger, besides the customary lumps and hard and soft spots due to variations in the texture of the filter cakes.

Means are provided in conjunction with a fabricating machine (Figs. 1, 2 and 4) for eliminating or reducing these detrimental physical characteristics to harmless proportions. I propose to treat the clay after it has been pugged but before it is applied to the mold and also after it has been applied to the mold, but prior to jiggering. This machine, as illustrated, is set-up to manufacture hollow ware. Later on, it will be explained how the machine may be set-up to make flatware.

Generally, the machine contains features characteristic of that of my said co-pending application, especially as to the manner in which the molds are handled and progressed through the machine and in other respects which will become evident as the description progresses.

As seen in Figs. 1, 2, 3 and 4, the molds are intermittently progressed to a mold cleaning station A, a charge feeding station B, and then to fabricating stations C, D, E, F and G. My novel equipment for puddling and troweling the clay is located at stations B and E. The equipment at station E is substantially as shown in my co-pending application.

The machine includes a frame 10 supporting for vertical reciprocation at the fabricating stations, respectively, crossheads 11, 12, 13, 14 and 15 operated by cams 16, 17, 18, 19 and 20 on a cam shaft 21, with the crossheads supporting mold chucks 22, 22a, 22b, 22c and 22d. The cam shaft is rotated by a gear 23, worm 24 on shaft 25 and motor 26.

Empty hollow ware molds 27 are placed in single file on a conveyor 28 (Fig. 2) and intermittently moved to the left into a transfer fork 29 at the station A where the mold is cleaned by a jet of air under pressure directed therein by a cleaner nozzle 29a. The transfer fork is then reciprocated to place the cleaned mold over a mold chuck 30 arranged at the feed station B and supported at the end of a bracket 31 of the crosshead 11 of the station C. A cam 32 on shaft 21 operates the fork through parallel links 33. As the chuck 30 is raised by the crosshead 11, it receives and elevates the mold from the fork into cooperative relation with the clay charge feeding means to receive a charge after same has been puddled, troweled and polished by other means later described. In the meantime, the transfer fork 29 is shifted back to the conveyor 28 and one of the split seats 41 of a reciprocating transfer frame 42 has shifted under chuck 30 to receive the charged mold as same is lowered. The transfer has its seats spaced in accordance with the spacing of mold chucks and is reciprocated the amount of said spacing by a cam 43 on the shaft 21 through a lever 44 and link 45 whereby each seat will alternately register over adjacent mold chucks.

After receiving the charged mold, the transfer frame shifts it to the next station C where it is raised again in chuck 22 for the next fabricating operation and so on through to the rest of the stations until it is shifted from the last station G with the finished ware therein onto a conveyor 46 to be carried thereon pending transfer to a dryer. The seats 41 are longitudinally divided so that when the transfer frame is shifted back after the mold chucks are raised therethrough, the opposite sides of the seats will clear the pedestals 47 of the crossheads upon which the chucks are removably mounted.

The chucks of the stations C to G are each vacuumized when raised to hold the molds therein and vented when lowered to release the molds through a hollow depending shaft 48 of the chuck communicating with a vacuum line 49 by way of a suitable slide valve 49a operated by each chuck crosshead.

Figures 4, 5:
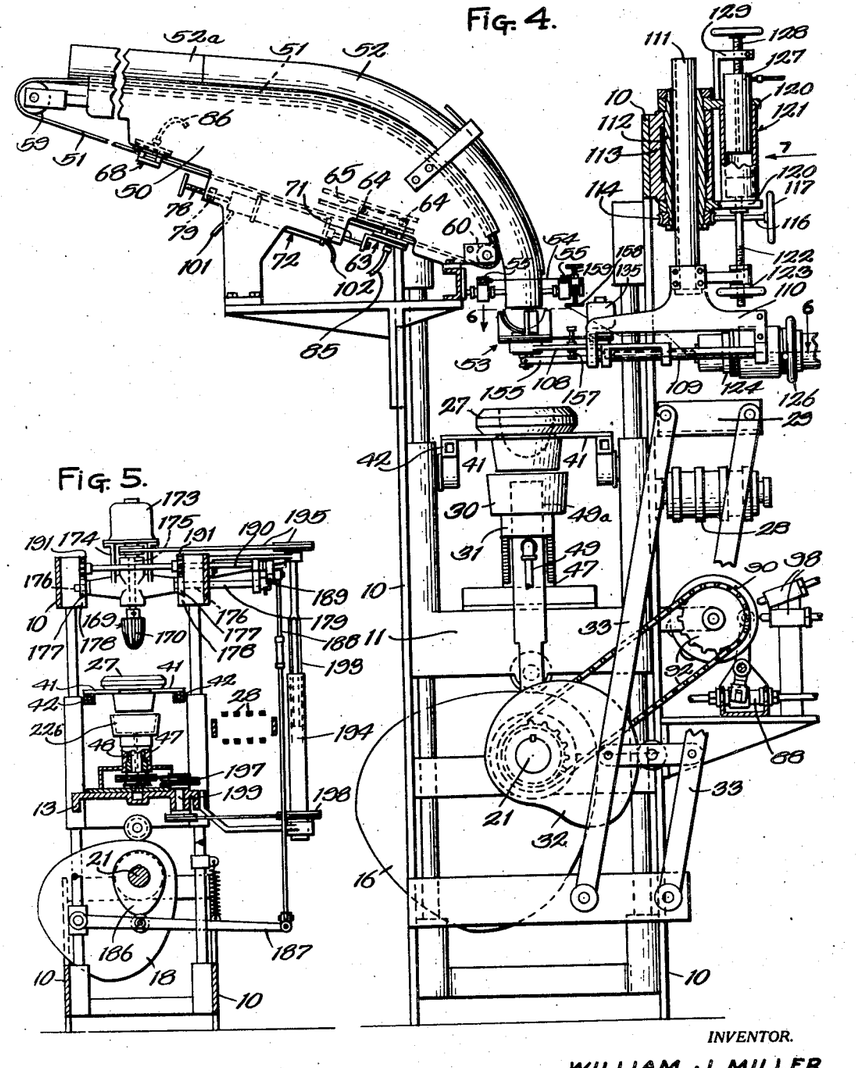
Fig. 4 is an enlarged end view of the machine as viewed from the left hand end of Fig. 2, and showing the puddling and troweling apparatus of the invention in connection with the clay charge feeding means.
Fig. 5 is a vertical section of the machine as taken substantially on the section line 5—5 of Fig. 1 and illustrating the apparatus employed to puddle the clay on the molds.

Clay charges are severed from an elongated column of clay composed of one or more pugs 52, Fig. 4. A receiver for the pugs of clay comprises a frame 50, adjustably mounted on the machine frame, having its upper surface formed like a trough in which the upper run of an endless conveyor belt 51 is disposed. The receiver trough has a horizontal loading portion where additional slugs of clay are placed on the machine, and a downwardly curved portion leading to the molds at a feeding station B where the leading end of the foremost pug is supported in substantially vertical position over the feeder chuck 30 and preferably in axial alignment with the vertical axis of the mold and chuck. The conveyor belt 51 progresses the clay toward the severing zone which is between the mold chuck 30 and the lowermost end of the pug. Due to this construction, the weight of added pugs of clay 52a is not imposed on the vertical portion of the column and therefor variations in the weight factor, due to the consumption of clay, have little or no effect on the amount and rate of feed.

The lowermost end of the foremost pug of clay is puddled and troweled before it is cut off. In other words, the clay comprising each mold charge is puddled and then the surface smoothed and polished before it is cut off from the parent mass. The surface which is smoothed and polished is that which engages the molding surface and, in the case of hollow ware, said charge is preferably shaped as will be later described for the purpose of facilitating spreading and avoiding air entrapment.

Figures 1, 16A:
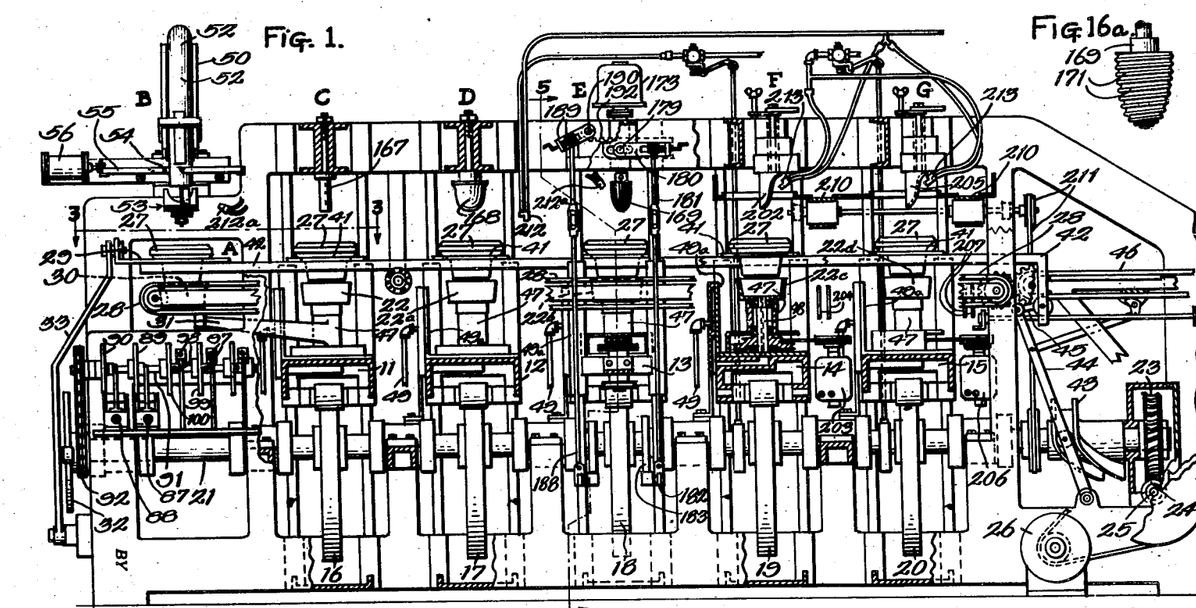
Fig. 1 is an elevation partly in section of the preferred form of machine for carrying out the method of the invention as it would be practiced in the production of hollow ware.
Fig. 16a shows an alternate form of puddling surface for the tool of Fig. 16.
Figures 2, 3, 3A, 6, 7:
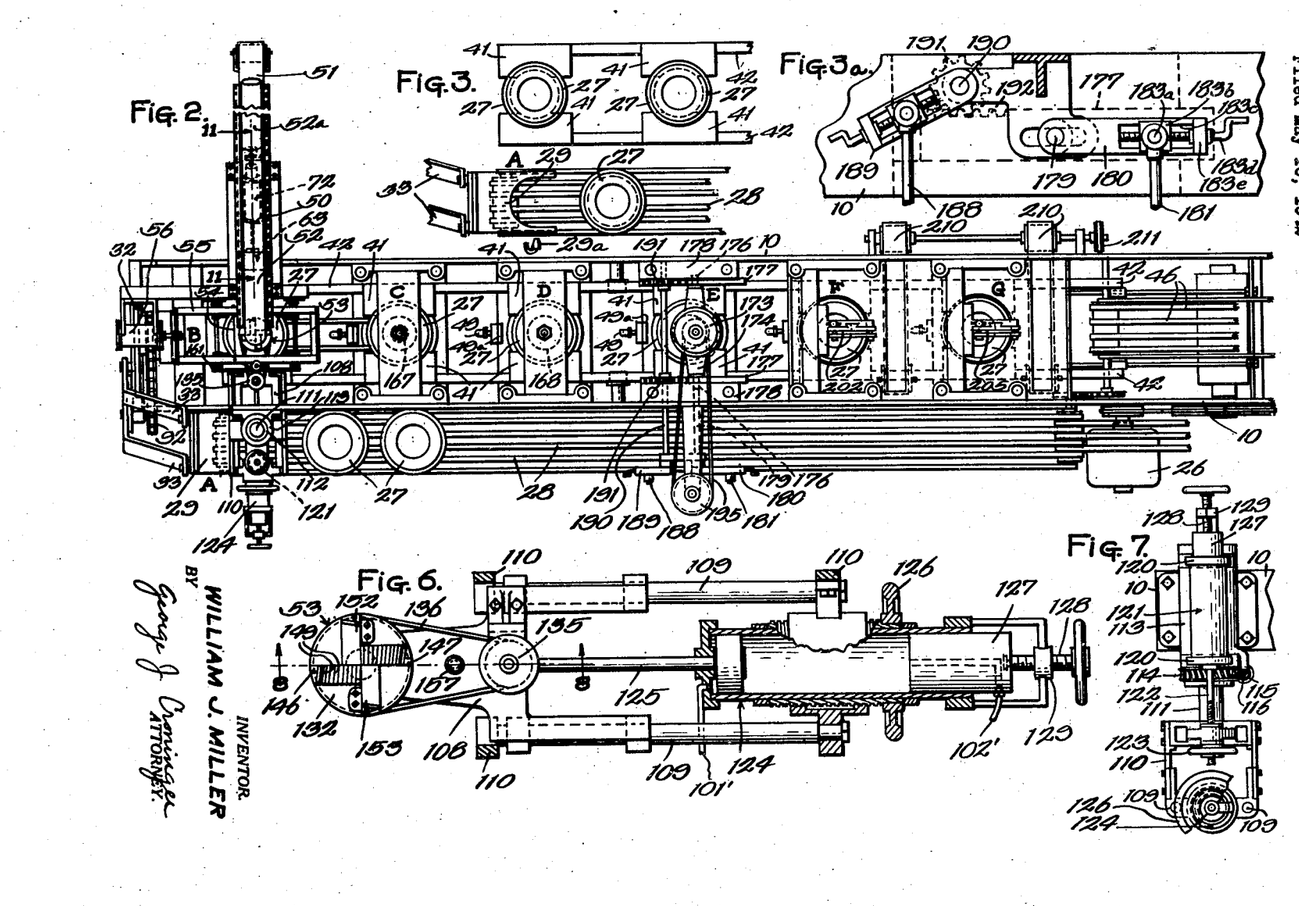
Fig. 2 is a top plan view of the machine of Fig. 1.
Fig. 3 is a detail plan section taken substantially on the section line 3—3 of Fig. 1, showing a portion of the mold conveying and transfer means.
Fig. 3a is an enlarged detail of parts seen in Fig. 1.
Fig. 6 is an enlarged detail plan section taken substantially on the section line 6—6 of Fig. 4.
Fig. 7 is an elevation of the operating means for the puddling and troweling apparatus, as viewed from the arrow 7—7 of Fig. 4.

After a previously charged mold has been lowered onto the transfer frame 42, the conveyor 51 is advanced a predetermined amount, the leading end of the pug of clay being projected below the feeder frame in position where it may be operated upon by a device 53 which is moved into position therebelow. This device has tools capable of puddling and forming the leading end of the pug into a smooth surfaced charge of predetermined shape. Upon completion of this operation, the device 53 is retraced from the charge, and an empty mold is raised to receive same as it is cut from the slug by a cutting wire 54 of a reciprocating frame 55 operated by a fluid motor 56 (Figs. 1 and 2).

Figures 9, 10, 11, 12:
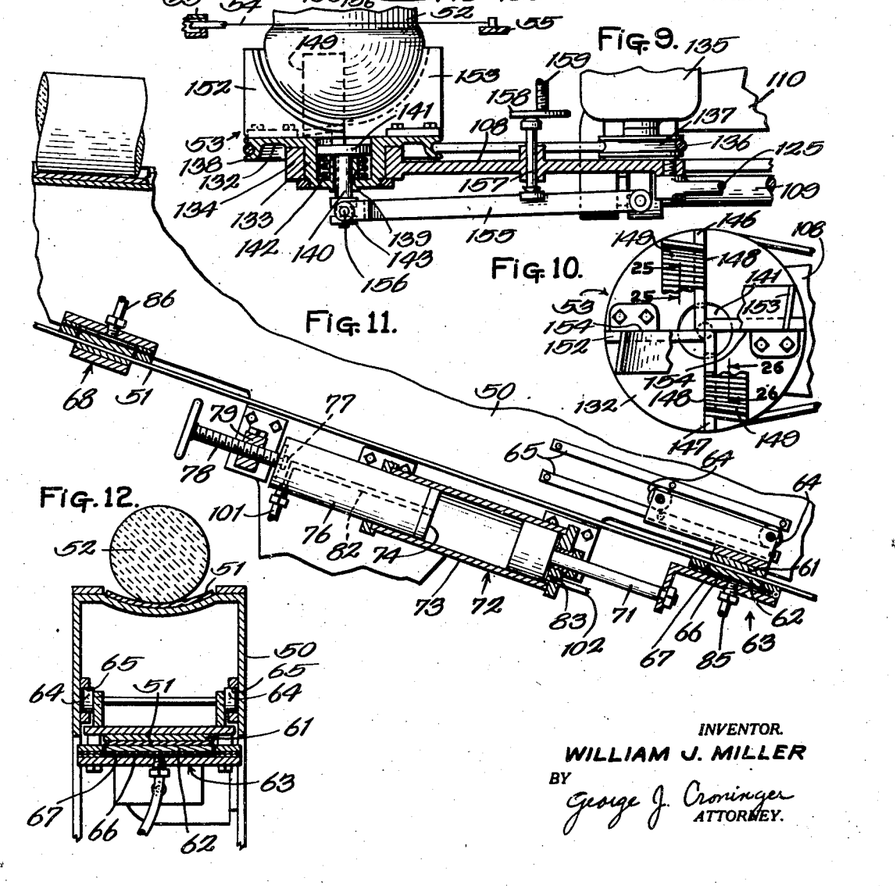
Fig. 9 is a view similar to Fig. 8 but showing the arrangement of the parts during the troweling or polishing operation.
Fig. 10 is a plan view of the combination puddling and troweling tools shown in Fig. 9 with parts broken away to more clearly disclose the structure.
Fig. 11 is an enlarged detail view of the clay charge feeding means seen in Fig. 1, but showing some of the parts in section, the view being taken substantially on the section line 11—11 of Fig. 2.
Fig. 12 is an enlarged detail section of the charge feeding apparatus, as taken on the line 12—12 of Fig. 4, with parts broken away.

Adjustable means are provided for operating the belt 51 whereby to accurately determine the desired bulk for the charges in accordance with the type of ware into which they are to be formed. For this purpose, the lower run of the belt 51 is tensioned between idler pulleys 59 and 60, Fig. 4, and extends between an upper anvil plate 61 and a pneumatically operated gripping shoe 62 of a gripping head 63 mounted for reciprocation in parallelism with said run by means of rollers 64 thereon operating in guideways 65 of the frame 50 (Figs. 11 and 12). The gripping shoe 62 is mounted on the upper flexible diaphragm wall 66, such as rubber, of an expansible chamber 67 of the gripping head, which, as the head is moved in one direction, is inflated to cause the shoe to clamp the belt upon the anvil plate to advance the belt therewith, the chamber being deflated upon the return stroke of the head to release the shoe from the belt. The belt is held from retracting with the gripping head 63 by a duplicate gripping head 68 which is fixedly mounted on the feeder frame 50, with its anvil plate arranged under the belt and operating to grip the belt when same is released from the head 63.

The gripping head 63 is connected with the piston rod 71 of a piston and cylinder type fluid motor 72 to be operated thereby. The cylinder 73 of the fluid motor is mounted on the feeder frame 50 and has an adjustable end wall 74 for limiting the stroke of the piston 75 of the motor in controlling the amount of advancement of the belt 51 in accordance with the clay bulk demand for the charges. The end wall 74 constitutes the inner end of a cylindrical core 76 in sealed telescoping engagement within the cylinder 73 and being adjustable into various positions therein by having a swiveling connection, as at 77, with the end of an adjusting screw 78 threaded in a bearing 79 of the frame 50. Fluid, such as air under pressure, may be admitted into the cylinder 73 at the core end thereof, in operating the piston 75, by way of a central port 82 in the core, air being admitted into the other cylinder end in a customary manner through a port 83.

Figure 28:
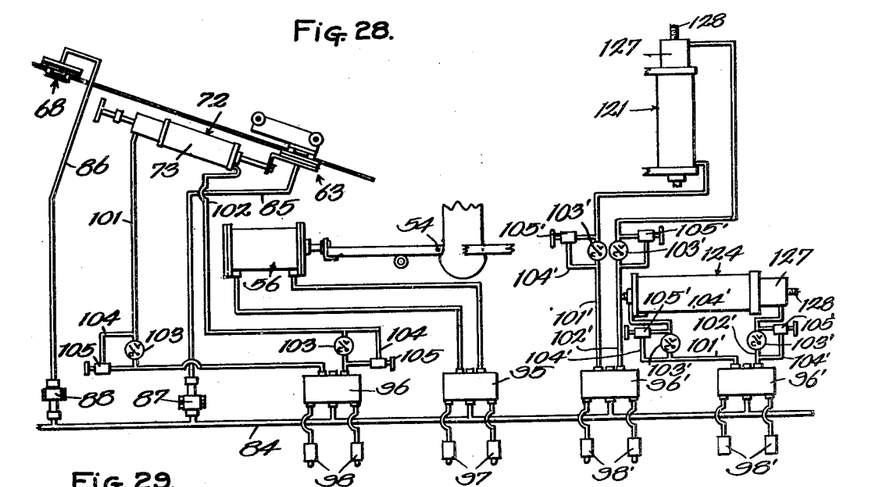
Fig. 28 is a piping diagram of the pneumatic system for the fluid pressure operated devices of the machine.

As seen in Fig. 28, the various fluid pressure operated devices described may be energized from a main 84 through suitable valve means. To this end, the chambers of the gripping heads 63 and 68 are connected with said main 84 by way of conduits 85 and 86 and three-way valves 87 and 88 operated by similar cams 89 and 90 on a timer shaft 91 driven in uniform timed relation with the cam shaft 21 through a sprocket and chain connection 92 therebetween (Figs. 1 and 4).

The ends of the charge-cutting motor 56 and slug feeding motor 73 are connected with the air pressure main through ordinary cylinder and piston type four-way valves 95 and 96 controlled by pairs of bleeder valves 97 and 98 operated by cams 99 and 100 on the timer shaft 91 (Fig. 1). The speed of advance imparted by the motor 73 to the slug-feed gripping head 63 may be regulated so that excessive momentum will not be imparted to the slug when fed. This is accomplished by including in each of the conduits 101 and 102, connecting the ends of the cylinder of said motor with its valve 96, a check valve 103 and a by-pass 104 of the conduit therearound controlled by a needle valve 105 whereby air will be admitted to the cylinder ends by way of the check valve and exhausted by way of the needle valve so that the rate of flow of the exhausting air may be regulated.

The device 53 (Figs. 4, 6, 8, 9 and 10) is supported on a crosshead 108 guided for horizontal reciprocation on horizontal guide rods 109 of another crosshead 110 arranged for vertical reciprocation by having an upright shaft 111 in sliding key connection with an elongated bearing sleeve 112 mounted for angular adjustment within a bearing 113 of the frame 10 whereby to adjust, while in operation, the device 53 with respect to the clay slug end. This adjustment of the bearing sleeve may be made through a gear 114 thereon meshing with a worm 115 (Fig. 7), on a shaft 116 supported by the bearing 113 and having a suitable hand wheel 117 for operating same. Carried by the bearing sleeve 112, by means of end brackets 120, is an upright cylinder and piston fluid motor 121 whose piston rod 122 connects, through an adjustable connection 123, with the crosshead 110 to operate same and whereby the uppermost movement of the device 53 into engagement with the end of the clay slug may be regulated. Carried by the crosshead 110 is a horizontal cylinder and piston fluid motor 124 whose piston rod 125 connects with the crosshead 108 to operate same for moving the device 53 into and out of axial alignment with the end of the clay slug in the lowered position of the device. The motor 124 is mounted on the crosshead 110 for longitudinal adjustment, through an adjustable connection 126, to adjustably limit advance of the crosshead 108 and for cooperating during angular adjustment of the bearing sleeve 112 in properly centering the tool 53 with respect to the clay slug end.

The fluid motors 121 and 124 are each similar to the slug feeding motor 72 in that the range of reciprocation of the piston thereof may be regulated by means of an adjustable core 127 in the outer end of the motor cylinder, the core being adjusted by means of an adjusting screw 128 in swiveling connection therewith and threaded in a bearing 129 connected with the motor cylinder. The purpose of this is to locate the tool 53 during its operation on the slug end and to confine the ranges of vertical and lateral movements of the tool to a minimum in accordance with the depth and diameter of the charges to be formed to expedite these movements and to minimize the space required, between the treated slug clay end and a mold about to receive the charge, to permit lateral withdrawal of the tool out of the way of the charge as it is dropped into the mold. Each of the motors 121 and 124 may also be energized from the air pressure main 84 by way of elements similar to these employed for the fluid motor 72 and designated by like reference numerals having prime exponents, and whereby rate of the various movements of the tool 53 may be regulated.

The device 53 comprises a rotating base 132 in the form of a wheel having a hollow depending trunnion 133 rotatably mounted in a bearing 134 in the outer end of the crosshead 108. The base is rotated by an electric motor 135 on the crosshead by way of a belt 136 providing a driving connection between a sheave 137 on the motor shaft and a sheave formation 138 of the wheel (Figs. 6, 8, 9 and 10). In the bottom wall of the trunnion 133 is a central bearing 139 within which is reciprocated, in keyed connection therewith, a depending stem 140 of a disc-like head 141 arranged in the trunnion and resiliently urged upward therein by a coiled spring 142 arranged therebelow in the trunnion. A collar 143 on the bottom end of the stem limits upward movement of the head 141 by engaging the central bearing 139.

Figure 8:
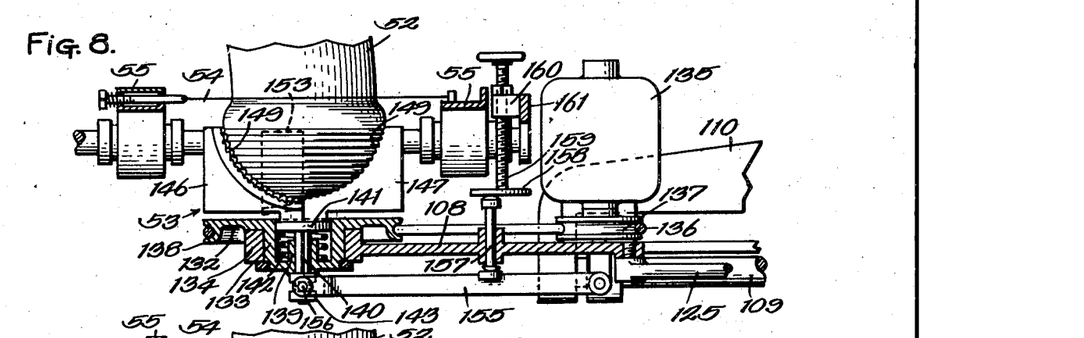
Fig. 8 is an enlarged sectional detail of the puddling and troweling apparatus as taken on the line 8—8 of Fig. 6 and showing the arrangement of the parts during the puddling operation.
Figures 23, 24, 25, 26, 27:
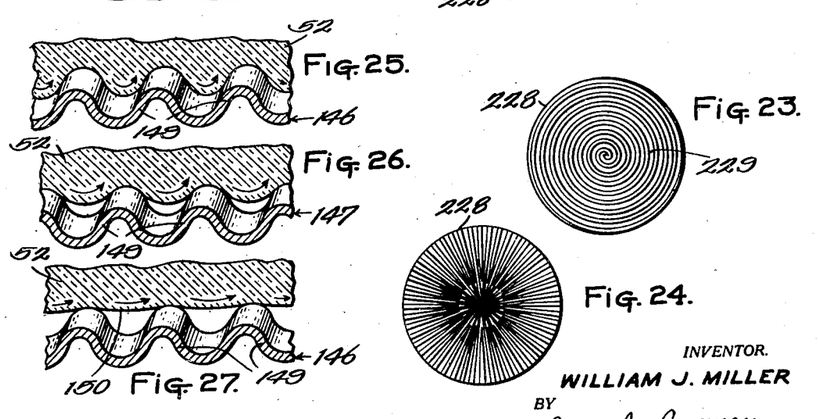
Fig. 23 is a face view of the puddling surface of the puddling tool of Fig. 22.
Fig. 24 is a face view of another form of puddling surface for the said tool.
Fig. 25 is an enlarged detail section taken on the section line 25—25 of Fig. 10, showing the manner in which one of the puddling blades acts upon bottom side of a clay charge.
Fig. 26 is an enlarged detail section taken on the section line 26—26 of Fig. 10, showing how the opposite puddling blade cooperates with the blade of Fig. 25 in wedging the clay as the tool recedes therefrom.
Fig. 27 is a view showing the blade of Fig. 25, in the last stage of the puddling operation as it recedes from the clay.

Mounted on the central head 141 of the base 132 are two diametrically opposed puddling tools 146 and 147, each being arcuately shaped with its clay working edge 148 radiating from the axis of the head so that when rotated against the end of the clay slug upon upward movement thereof with the crosshead 108, said end will be spread to assume a surface contour generally corresponding with that of the mold surface for which the charge is intended (Fig. 8). The said tools are also provided with clay puddling formations 149, such as comparatively small transverse alternate ridges and grooves or corrugations, with the ridges of one tool disposed in the path of the grooves of the other tool whereby they will produce a kneading or working of the subsurface clay, as seen in Figs. 25 to 27. These corrugations may be so angularly disposed with respect to the working edges 148 of the tools, as to produce an inward plowing effect on the clay, the clay being constantly turned over, as indicated by the arrows in Figs. 25 to 27. However, the corrugations may be so arranged as to cause the clay to be turned over in an outward direction, or back and forth as desired depending on the consistency of the clay and the desired shape of the charge.

As the base 132 continues to advance (Figs. 9 and 26), the tools 146 and 147 are caused to retract from the end of the slug whereby the depth of the plowing effect will be so gradually reduced as to cause a general smoothing out of the surface of the clay, as indicated at 150 (Fig. 27). Upon final upward movement of the base 132, the surface of the shaped and puddled clay is smoothed and polished by a pair of diametrically opposed bladelike tools, sometimes called trowels, 152 and 153 mounted on the base and arranged at right angles to the puddling tools. The tools 152 and 153 may be fixedly or removably mounted on the base with their working edges 154 (Fig. 10), radiating from the axis of the base. By so arranging the working edges of the tools, they will interfit in such a manner at the axis of the base whereby they will be effective at this point without interfering with each other, but it is preferred to make the tools continuous across the center to avoid leaving a mark or projecting teat.

The central head 141 of the base 132 is depressed to retract the puddling tools 146—147 by a lever 155 on the crosshead 108 which has a swiveling connection, as at 156, with the collar 143, and actuated by a reciprocating pin 157 on the crosshead, as the pin engages a normally stationary stop 158 upon upward movement of the head. The stop 158 comprises a disc on the bottom end of a vertical adjustment screw 159 threaded in a bearing 160 of a bracket 161 of the feeder frame 50, whereby adjustment of extent of and initiation of withdrawal of the device 53 can be made and to accommodate various settings of advance of the crosshead 108 in the treatment of various types of charges.

Figures 13, 14:
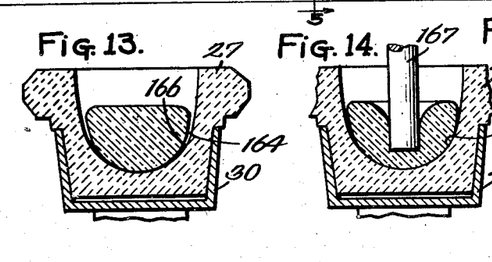
Fig. 13 is a sectional view of a hollow ware mold contained in a chuck at the charge feeding station of the machine with a puddled, polished and partially formed charge, therein.
Fig. 14 shows the clay charge of Fig. 13 being initially pressed upon the molding surface of the mold, at the next station of the machine.
Figure 15:
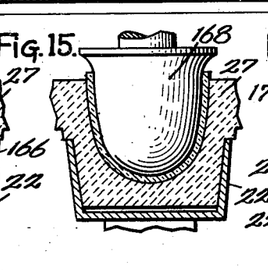
Fig. 15 shows the clay charge being spread over the molding surface of the mold, at the next station of the machine.

It is contemplated that the shaping of the end of the clay pug should be such for making hollow ware or cups in cavitous molds, that the rounded bottom 164 of the fed charge (Fig. 13) will have a slightly smaller arcuate contour than the arcuate contour of the molding surface 166 of the mold, so that the surface of the charge will progressively engage the molding surface upwardly when spread thereover to prevent air entrapment. Likewise, for flat ware, the concavity of the charge will be flatter than the convexity of the mold and suitably contoured for the same purpose.

If desired, a station C may be provided where the charged mold is raised under a co-axial comparatively small diameter tool 167 (Figs. 1 and 14) whose purpose is to press the central portion of the charge against the molding surface and improve the adhering relation therebetween. Also, the tool causes the charge to enlarge diametrically and become slightly spread out in order to cover the bottom of the mold and expel any air that is likely to become trapped. The tool is plungerlike in shape and the clay-engaging surface is preferably non-adhesive to clay. The latter may be accomplished by heating the plunger tip or making it permeable and venting compressed air therethrough. It will be obvious, that although the plunger is stationary and the mold and chuck are raised by cam 16 and crosshead 11, the plunger can be actuated instead or both the chuck and plunger may be moved relative to one another in order to press the charge. It will also be understood that this station may be omitted.

Station D is known as the press station and at this location, the charge of clay is pressed and spread out over the molding surface by a male pressing die 168. The clay engaging surface of this die is contoured as the molding surface of the mold and is rendered non-adhesive to clay by heating or by other suitable means. Like the tool 167, the die 168 is mounted on the frame 10 for vertical adjustment and replacement with dies of other shape, size or type. Furthermore, the die may be moved relative to the mold and chuck during the pressing operation in obvious fashion although, as shown, it is stationary and the chuck and mold are raised by cam 17 and crosshead 12. If station C is omitted, the mold with the charge of clay therein will move directly from the feeding position B to the press position D.

Figure 16:
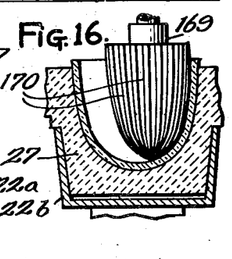
Fig. 16 shows the clay of the finally pressed charge being puddled from the exposed surface at the next station of the machine preparatory to jiggering at the next station or stations of the machine.

The next station E is also optional and is provided for the purpose of puddling the charge of clay after it has been pressed and spread out. In this instance, the exposed or upper surface of the charge is puddled, this surface representing the interior surface of hollow ware or the bottom side of flatware articles. With reference to Figs. 1 and 16, when the charge of clay is puddled, it may also be further spread by an axially aligned or eccentrically arranged, rotating or stationary puddling tool 169 while the mold may be rotated at optimum speed in the same or opposite direction or remain stationary relative to the tool to effect optimum wedging. However, the wedging tool 169, for cup molds, is shown longitudinally corrugated, as at 170, and so driven that its peripheral speed so differs with that of the speed of the surface of the clay as to cause a kneading surface shifting or plowing effect upon the clay, the tool being shifted laterally into engagement with the clay and then retracted upon completion of the operation. However, the tool may shift back and forth during the wedging operation, if desired, and its corrugations may be arranged thereabout in a continuous or interrupted spiral, as shown at 171 (Fig. 16a). In this form, the peripheral speed of the tool may be equal to that of the work. Surface contour and clay condition will govern optimum tool surface design.

As shown in Figs. 1, 2 and 5, the puddling tool 169 is driven by an electric motor 173 supported on a housing 174 supporting an upright shaft 175 coupled with the motor shaft at its top, and on whose bottom end the tool is removably mounted. The housing 174 has opposite trunnions 176 journaled in bearings in parallel longitudinal slides 177 in frame members 178. The trunnion 176 on the conveyor side of the machine has a shaft extension 179 having a crank 180 connected by an adjustable link 181 with a lever 182 operated by a cam 183 on shaft 21. This cam may be formed to tilt the housing 174 and tool 169 through any desired degree at optimum phase or speed, or not tilt it as found best in practice. The position of tilt is adjusted through link 181 and extended through an adjustable crank pin 183a of the crank 180, as seen in Fig. 3a. The crank pin may extend from a slide 183b guided in a longitudinal guide-way 183c of the crank 180 and adjusted by an adjusting screw 183d threaded in a bearing 183e of the crank. The slides 177 and tool 169 are shifted laterally by a cam 186 operating a lever 187 connected by an adjustable link 188 with an adjustable radius crank 189 on a shaft 190 having gears 191 meshing with rack teeth 192 on the slides, whereby the tool may be moved into selected cooperative positions with respect to the work at predetermined intervals.

The chuck 22b is rotated by the motor 173 (Fig. 5) through two telescopically coupled shafts 193 and 194 carried by one of the frames 178 and the crosshead 13, the former shaft being in driven connection with the motor through a pulley and belt drive connection 195, and the latter shaft being in driving connection with the shaft 48 of the chuck through variable speed pulley and belt drive connections 197 and 198 and an intermediate shaft 199 on the crosshead to regulate rate of rotation of the clay charge with respect to that of the wedging tool.

Upon completion of this puddling operation or upon completion of the die pressing operation, if station E is omitted, the mold is shifted to the station F, it is raised and rotated by the chuck 22c in such manner that the charge is shaped and smoothed by a profile 202 detachably and adjustably mounted on the machine frame. The chuck 22c is rotated by a motor 203 arranged on the crosshead 14 and energized when elevated by electric contacts 204. This station may comprise the final station in the fabricating line and the ware may pass directly to the dryer upon completion of this profiling or jiggering operation. It will be understood that the machine may include only three stations, namely the feeding station where the charge is puddled and/or polished, cut off and placed on the mold, a press station and a jigger station. If a double jiggering operation is desired, profile 202 may operate as a rough finishing tool and another station, G added for final finishing, smoothing and polishing. In such event, when the mold is shifted to the station G, the mold is elevated by the chuck 22d and rotated thereby preferably in a direction opposite to that of its rotation at the station F in such manner that the charge is again jiggered by a profile 205 whose jiggering edge is beveled oppositely or reversely to that of the tool 202. The chuck 22d is rotated by a motor 206 on the crosshead 15 and energized by contacts 207 when elevated.

In the second profiling a drag would be imposed on the material counter, but to a less degree, to that received during the first profiling operation, thereby closing up any surface fissures that may have been produced by the roughing tool and relieving strains imposed by the first profile 202. Also the clay surface is given its final high polish and it is preferred that a minimum of excess clay be removed during this operation.

At both jiggering stations, scrap clay conveying belts 210 carry the excess clay to a suitable reconditioner, the belts being driven through a pulley and belt drive connection 211, with the shaft 21.

The surface of the clay may be moistened, between stations by spray guns 212, and the working surfaces of the tools may be moistened prior to or during kneading by spray guns 212a. The puddling tools may be heated or made permeable and compressed air progressed therethrough to prevent clay adhesion thereto. Also during each profiling operation, the work may be lubricated by spray guns 213.

With regard to the manufacture of flatware, it will be understood that the charge of clay in this instance is disc like in shape and according to this invention is puddled and/or polished on the surface which will lay against the mold (and later becomes the upper or display surface of the article) before it is cut off the pug.

It is desired, when making flatware, such as dinner plates, to use a pug of clay where outside diameter is about two thirds the diameter of the molding surface to thereby minimize the amount of spreading later on to expand the charge to full ware size. Obviously, the charge can be made the same diameter as the ware-forming surface and pressed against the mold later by a die to affix the clay thereto preparatory to jiggering. In this event, the charge would spread out beyond the molding surface. A mold with a ricket edge may be used to crack off any spare that spreads beyond the actual molding surface. Furthermore, in making coupes, nappies and the like a smaller diameter, thicker charge may be used. In all instances, it is proposed to press the clay against the mold with a die to firmly affix the charge thereto because in jiggering, the clay must be stuck to the mold to resist the drag of the profile tool.

Figure 17:
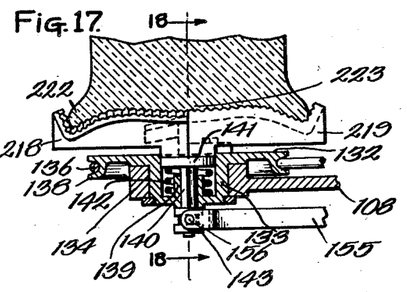
Fig. 17 is an enlarged section of a puddling and troweling tool adapted for flatware charges such as plates or saucers, and showing the arrangement of the parts during the puddling operation.
Figure 18:
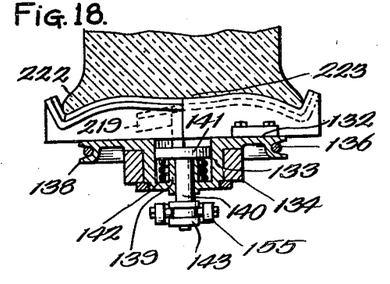
Fig. 18 is a section taken on the line 18—18 of Fig. 17, but showing arrangement of the parts during the troweling operation.
Figure 19:
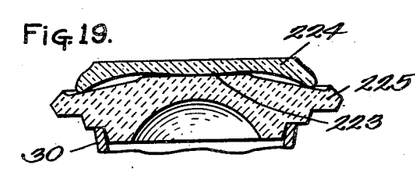
Fig. 19 is a sectional view of a flatware mold held in a chuck at the feeding station with a puddled, troweled charge thereon.

In the production of flat ware, such as plates and saucers, the charges may become further enlarged and may be contoured by the puddling and trowelling tools. The puddling tools 218—219 (Figs. 17 and 18) preferably flare and dish the pug end, as at 222, with a slight central bulge 223. Thus, when the charge 224 is cut from the pug and dropped centrally on the mold 225 (Fig. 19), its central bulge first contacts the central mold surface, then progressively contacts and expels the air towards the mold brim.

Figure 20:
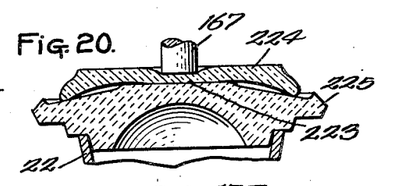
Fig. 20 shows the charge of Fig. 19 being initially pressed onto the flatware mold.
Figure 21:
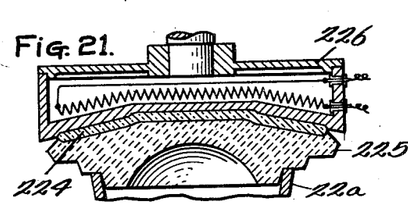
Fig. 21 shows the charge of Fig. 20 being pressed out on the molding surface of the flatware mold by one form of die.

Consequently, the charge may be comparatively thin. As in the case of hollow ware the center section may be first pressed against the mold at station C by a suitably contoured plunger 167 (Fig. 20), but this is optional. At station D, the charge is pressed out and affixed to the molds by a non adhesive die 226 (Fig. 21), which may be non-rotatable and stationary as respects the mold or may be moved vertically relative thereto.

Figure 22:
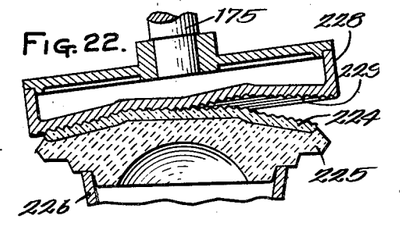
Fig. 22 is a sectional view showing a puddling tool operating upon the flatware charge.

Station E is also optional and if incorporated in the system would be provided with various puddling tools disclosed in the aforementioned co-pending application, or by a flat ware tool 228 (Fig. 22) shown mounted on the motor driven shaft 175 adapted to be tilted in relation to the axis of the mold with its working surface corrugated scroll-like, as at 229 (Fig. 23). The corrugations may be arranged radially, as seen in Fig. 24, to effect the kneading operation on a radial line of the clay surface on the side of the axis of the ware, the alternate ridges and grooves of either type of working surface effecting the puddling operation practically in the same manner as heretofore described in connection with the hollow ware tools.

Obviously, tools, chucks and other equipment are applied best suited to the ware being produced.

This invention comprehends the combination, in an organized machine, of means for transporting molds to feeding and forming positions and bat polishing and cut off mechanism, die pressing means and jiggering means for performing sequence and in the order named the steps of bat polishing, cut off, pressing and jiggering automatically, the latter being a process for the manufacture of pottery flatware such as dinner plates, saucers, coupes, nappies and the like.

In connection with the polishing of the bat, whether done before or after the charge is applied to the mold, I prefer to utilize tools, such as those disclosed in the patents to Frank Kinnard, No. 2,167,386, 1,778,324 and 1,513,602, although as distinguished thereover, my tools may, if desired, be curved in a lengthwise direction to fit a given shape. These tools are known as spreading tools, as distinguished from puddling or kneading tools and their purpose and function is to smooth the surface of the charge and thereby eliminate pinholing and other defects. Furthermore, these tools, may, when pushed against the end of the pug cause a spreading out of the material in a radial direction and therefor may be considered as having this function where it is desired to so utilize the tool.

I also prefer to mount and arrange the spreading tools on the carrier head as shown in the Kinnard patents above mentioned and it is understood that the spreading tool may have four or more blades as disclosed in the Kinnard patents, if desired.

Figure 34:
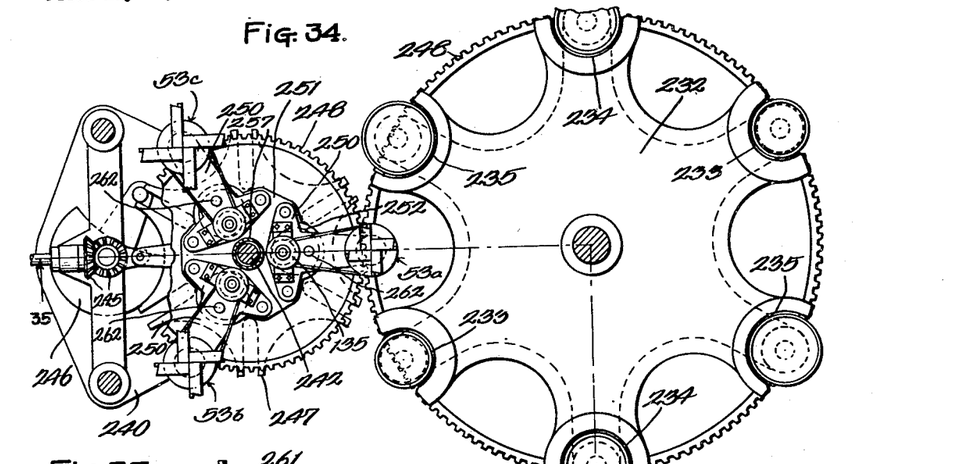
Fig. 34 is a diagrammatic view in plan illustrating generally one form of adaptation of the invention to a rotary machine for producing diversified ware.
Figure 35:
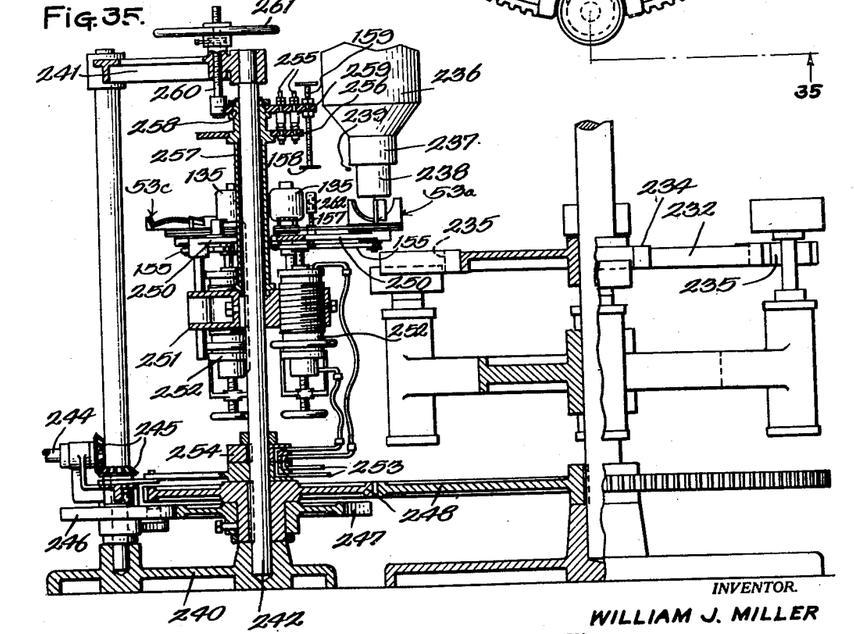
Fig. 35 is a section view taken on the line 35—35 of Fig. 34.

One style of rotary machine to which the invention may be adapted is diagrammatically shown, in Figs. 34 and 35, as including a turret 232 having spaced thereabout two sets of mold seats 233, 234 and 235 for supporting molds for cups, saucers and plates respectively. The turret is intermittently rotated to advance molds in said seats centrally under a clay extrusion cylinder 236 from whose depending nozzle 237 the clay column 238 is extruded the proper length for each mold and cut off by a suitable cutter 239 and dropped into the molds for fabrication at various stations about the turret.

One form of the invention adapted for this machine may include a frame comprising a base 240 and a top frame member 241 supporting an upright intermittently rotated shaft 242 upon which are arranged thereabout three types 53a, 53b and 53c of the wedging device 53 adapted for the cup, saucer and plate charges, and into co- operative relation with which the devices are brought before the charges are cut. The shaft 242 is driven by a power shaft 244 through bevel gears 245 and a Geneva motion connection including a crank-and-lock disc 246 and a six-pointed star wheel 247, and is in driving connection with the turret through gearing 248 whereby the mold seats and devices will alternately register under the extrusion nozzle.

In this form, the motor 135, lever 155 and other parts associated therewith for operating each device 53a, 53b and 53c would be supported on a cross-head 250 mounted for vertical reciprocation on a turret 251 arranged on the shaft 242 for vertical adjustment and supporting a piston-and-cylinder motor 252 similar to the motor 124 for reciprocating the cross-head to move the device into and out of engagement with the clay column. When each device is positioned under the clay column, its associated motor 252 is energized from air pressure lines 253 through a distributor 254 on the shaft 242 and its motor 135 is energized from electric contacts 255 through a distributor 256 carried on said shaft. The distributor 256 and turret 251 are secured to a sleeve 257 in sliding-key connection with the shaft 242 and being in swiveling connection, as at 258, at its top end, with a plate 259 having an upright screw 260 slidable in a bearing in the top frame member 241 with a hand-wheel 261 threaded thereon for adjusting the mean elevation of the devices simultaneously in accordance with various types of rotary machines. The plate 259 may support the electric contacts 255 and also support the stop 158 and adjusting screw 159 for successively cooperating with the pins 157 of the devices in retracting the wedging trowels.

The motors 252 are adjustable on the turret 251 to vary the upper limits of movement of the devices in accordance with the length of the charges upon which they operate, and the pins 157 may be provided with a sleeve 262 threaded on the top end thereof for adjusting initial contact with the stop 158 in accordance with the range and upper limit of movement of the devices.

I claim:

1. The method in the manufacture of pottery ware which comprises, working the clay comprising the end of a pug of plastic clay with a gyrating motion about the axis of the end so as to mitigate physical properties having a detrimental effect on the drying or firing behavior of the clay, then cutting off the treated end of the pug and applying it to a mold and thereafter completing the plastic state formation of the ware.

2. The method in the manufacture of pottery ware which comprises, working the clay comprising the end of a pug of plastic clay with a circular motion about the axis of the end so as to mitigate physical properties having a detrimental effect on the drying or firing behavior of the clay, then cutting off the treated end of the pug and applying it to a mold with the previously worked surface against the molding surface, working the opposite surface of the clay for the purpose previously specified and completing the plastic formation of the ware.

3. The method in the manufacture of pottery ware which comprises, puddling and troweling the clay comprising the end of a pug of plastic clay to mitigate physical properties having a detrimental effect on the drying and firing behavior of the clay, then cutting off a slice of clay from the end of the pug and applying the slice, puddled side down on the molding surface of a mold, then puddling the opposite surface of the slice whilst on the mold and thereafter completing the plastic state formation of the ware on the mold.

4. The method in the manufacture of pottery ware which comprises, working the clay comprising the end of a pug of plastic clay in such fashion as to mitigate internal physical properties having a detrimental effect on the drying or firing behavior of the clay, then cutting off a slice or body of clay from the worked end of the pug and applying the same to the molding surface of a mold, then pressing the slice or body to spread out the clay over the molding surface and then jiggering the clay to complete the plastic state formation of the ware.

5. The method in the manufacture of pottery ware which comprises, working the clay comprising the end of a pug of plastic clay in such fashion as to mitigate internal physical properties having a detrimental effect on the drying or firing behavior of the clay while shaping up the end of the pug to fit the molding surface or a portion thereof, then cutting off a slice or body of clay from the worked, shaped end of the pug and applying the same to the molding surface of a mold, then pressing the slice or body to spread out the clay over the molding surface and thereafter jiggering the clay to complete the plastic state formation of the ware.

6. The method in the manufacture of pottery ware which comprises, smoothing and spreading out the mold engaging surface of a mold charge and then applying the charge to a mold with the smoothed surface in engagement with the molding surface thereof, pressing the charge to spread out the clay over the molding surface and bond the clay thereto and thereafter jiggering the charge to complete the plastic state formation of a piece of jiggered ware.

7. In the manufacture of jiggered pottery ware, the method which comprises, pugging and extruding a plasticized mixture of ceramic materials, severing a pug from the extrusion containing sufficient material for a plurality of mold charges, advancing the pug in endwise fashion toward a charge severing zone, severing charges of clay from the leading end of the pug in successive order and prior to each severing operation, working the lead end of the pug in such fashion as to mitigate internal physical properties having a detrimental effect on the drying and firing behavior of the clay.

8. In the manufacture of jiggered pottery ware, the method which comprises, pugging and extruding a plasticized mixture of ceramic materials, severing a pug from the extrusion containing sufficient material for a plurality of mold charges, advancing the pug in endwise fashion toward a charge severing zone, severing charges of clay from the leading end of the pug in successive order and prior to each severing operation, puddling and troweling the leading end of the pug.

9. In the manufacture of jiggered pottery ware, the method which comprises, pugging and extruding a plasticized mixture of ceramic materials, severing a pug from the extrusion containing sufficient material for several mold charges, axially moving the pug towards molds at a feeding station, severing charges of clay from the leading end of the pug in successive order and prior to severance of each charge, making the end of the pug symmetrical with the molding surface by shaping it.

10. In the manufacture of jiggered pottery ware, the method which comprises, pugging and extruding a plasticized mixture of ceramic materials, severing a pug from the extrusion containing sufficient material for a plurality of mold charges, axially moving the pug towards molds at a feeding station, severing charges of clay from the leading end of the pug in successive order, smoothing the mold engaging surface of the charge prior to severance from the pug, working the opposite surface of the charge after severance to mitigate undesirable physical properties and thereafter jiggering the charge.

11. In the manufacture of jiggered pottery ware, the method which comprises, plugging and extruding a plasticized mixture of ceramic materials, severing a pug from the extrusion containing sufficient material for several mold charges, severing charges of clay from the pug, working the pugged clay comprising each charge before and after severance from the pug to mitigate physical properties having detrimental effect on the drying and firing behavior thereof and thereafter fabricating each clay charge into ware.

12. In the manufacture of hollow pottery ware, the method which comprises, pugging and extruding a plasticized mixture of ceramic materials, severing a pug from the extrusion containing sufficient material for several mold charges, axially advancing the pug towards a hollow ware mold at a feeding station, severing charges of clay from the leading end of the pug in successive order, shaping the end of the pug prior to severance, dropping the charge into the molding cavity and sticking the charge to the bottom of the cavity.

13. In combination, means for advancing pugs of clay to a severing zone, a severing means for cutting off slices or charges of clay therefrom and means operable to puddle the lead end of the pug being severed in such fashion as to mitigate physical properties having detrimental effect on the drying or firing behavior of the clay.

14. In combination, means for advancing pugs of clay to a severing zone, a severing means for cutting off slices or charges of clay therefrom and means operable on the lead end face of the pug to puddle and smooth the end of the pug being severed.

15. In combination, means for advancing pugs of clay to a severing zone, a severing means for cutting off slices or charges of clay therefrom and means operable to round the end of the pug before it is cut off.

16. In combination, means for advancing a pug of clay toward a severing point, a severing means for cutting off slices of clay therefrom and a rotating spreader operable to smooth and spread out the end of the pug between severing operations.

17. In combination, clay charge positioning means, a device movable toward and away from a positioned charge, and means on said device operative when moved part way toward the charge for puddling a surface thereof, and for smoothing the puddled surface upon final movement theretoward.

18. The structure as defined in claim 17, wherein said device includes a rotating head, a puddling tool mounted on the head to rotate therewith and for movement into and out of operating position, means for moving said tool out of operating position upon said final movement of the device, and a smoothing tool arranged on the head to rotate therewith and brought into operating position upon said final movement of the device.

19. The combination with a means for feeding a pug of plastic material downwardly, a substantially horizontal cut off wire, means for moving the wire horizontally through the pug to cut off a slice of clay and deposit said slice on a mold therebelow, a rotatable spreader, means for moving said spreader into position below the end of the pug of clay and then upwardly thereagainst and apparatus for synchronizing the operation of said means.

20. A clay puddling device comprising a rotatable head and a blade carried by the head to extend radially of its axis and having clay puddling formations comprising transverse alternate ridges and grooves slanting away from a working edge of the blade.

21. A clay puddling device comprising a rotatable head and a pair of blades carried by the head to extend radially of its axis, each blade having clay puddling formations comprising transverse alternate ridges and grooves slanting away from a working edge thereof, with the ridges of one blade disposed in the path of the grooves of the other blade upon rotation of the head.

22. A clay puddling and smoothing device comprising a rotatable head, a clay smoothing trowel carried by the head to extend radially thereof and a puddling blade mounted on the head to rotate therewith and arranged for axial movement with respect thereto above and below the path of the smoothing blade when rotated.

23. A clay puddling and smoothing device comprising a rotatable head including a hollow trunnion, a supporting head reciprocable in the trunnion and rotatable therewith, a clay smoothing trowel carried by the rotatable head and a clay puddling blade carried by the supporting head for movement therewith above and below the path of the smoothing blade.

24. In combination, a conveyor belt for conveying a pug of clay to a cut off position, fluid operated means for gripping the belt and moving same, a cutting device for cutting charges from the pug at said position, fluid operated means for operating the device, and means for synchronizing the operating of both said fluid operated means.

25. In combination, a conveyor belt for conveying a pug of clay to a cut off position, fluid operated means for gripping the belt and moving same at intervals, fluid operated means for gripping the belt and holding same between said interval, fluid operated means for cutting charges from the pug at said position between said intervals, and means for synchronizing the operation of said various fluid operated means.

26. In combination, means for advancing molds to a feeding station, a conveyor for advancing a pug of clay downwardly over molds at said station, fluid operated means for operating the conveyor at intervals, a clay working device, fluid operated means for moving said device into and out of cooperative relation with the end of the pug of clay between said intervals to work the clay at said end, and device for cutting charges from said pug end, fluid operated means for operating the cutting device between the operation of the clay working device and conveyor advancing means, and means for synchronizing the operation of said various fluid operated means and mold advancing means.

27. In combination, means for intermittently advancing a succession of molds, means for feeding clay charges to the molds when at a given station and including means for puddling and smoothing the mold engaging surfaces of the charges before being fed, means at another station for spreading the charges over the molds into partially formed ware shapes, means at another station for puddling the exposed surfaces of the partially formed ware shapes and means at another station for jiggering the puddled exposed surfaces of the ware shapes.

28. In combination, means for intermittently advancing a succession of diversified pottery ware molds, and means at a given station for feeding diversified clay charges to the molds having means associated therewith for puddling and shaping the charges correlatively with respect to the molds before being fed.

29. The structure as defined in claim 28, wherein the last means includes a group of diversified clay working tools, and means for successively bringing same into cooperative relation with the charges before being fed.

30. In combination, means for advancing a pug of clay toward a severing point, a severing means for cutting off slices of clay therefrom, a rotating spreader operable to smooth the end face of the pug between slicing operations a movable support for said spreader and means for moving said support to shift the axis of rotation of the spreader from one position to another.

31. In combination, means for advancing a pug of clay toward a severing point, a severing means for cutting off slices of clay therefrom, rotatable means engageable with the end of the pug for smoothing the end of the pug, a movable support for said smoothing means and means for moving said support to shift the axis of rotation of the smoothing means from one position to another.

32. In combination, means for advancing a pug of clay toward a severing point, a severing means for cutting off slices of clay therefrom, a rotatable shaper for contouring the end of the pug between severing operations a support for said shaper and means for moving said support to shift to axis of rotation of said shaper from one position to another.

33. In the manufacture of potteryware, the method which comprises, moving a cylindrical pug of clay downwardly toward and in axial alignment with a mold, periodically cutting off slices of clay from the leading end thereof and prior to severance, working on the lead end surface portion of the pug to knead and smooth the same in preparation for application to the mold.

34. The combination with means for feeding a column of clay to a charge segregating station and a movable cutter for segregating slices from said column of a smoothing implement for smoothing the leading end of the column, means for rotating said implement, a support for said implement and means for moving said support to carry the implement into and out of smoothing position.

35. The combination with means for feeding a column of clay to a charge segregating station and a movable cutter for segregating slices from said column of means for puddling and troweling the leading end of said column and means for moving said puddling and troweling means into engagement with the leading end of said column between cutting operations.

36. The combination with means for feeding a column of clay to a charge segregating station and a movable cutter for segregating slices from said column of means for puddling the leading end of said column and means for moving said puddling means into engagement with the leading end of said column between cutting operations.

WILLIAM J. MILLER.

REFERENCES CITED

The following references are of record in the file of this patent:

UNITED STATES PATENTS

| Number | Name | Date |
|---|---|---|
| Re. 20,401 | Miller | June 8, 1937 |
| 511,587 | Clark | Dec. 26, 1893 |
| 622,746 | Wolcott | Apr. 11, 1899 |
| 836,169 | Wyllie | Nov. 20, 1906 |
| 1,395,161 | Strobl | Oct. 25, 1921 |
| 1,569,242 | Smith | Jan. 12, 1926 |
| 1,875,175 | Michael | Aug. 30, 1932 |
| 1,977,699 | Sebring, Jr., et al. | Oct. 23, 1934 |
| 2,177,607 | Brown et al. | Oct. 24, 1939 |
| 2,278,513 | Emerson | Apr. 7, 1942 |
| 2,313,056 | Emerson et al. | Mar. 9, 1943 |